June 10, 1969  J. MEDNEY  3,449,484
METHOD FOR FORMING FILAMENT REINFORCED RESIN SHELLS OF
NON-UNIFORM CROSS SECTION
Filed Oct. 5, 1966  Sheet 1 of 2
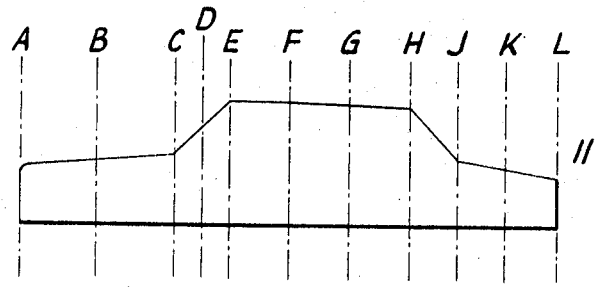
FIG. I
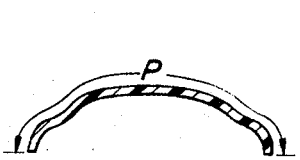
FIG. IB
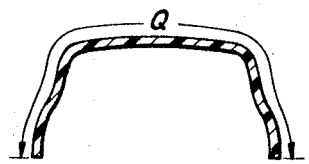
FIG. IF
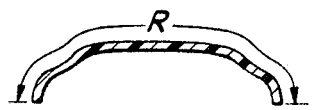
FIG. IK
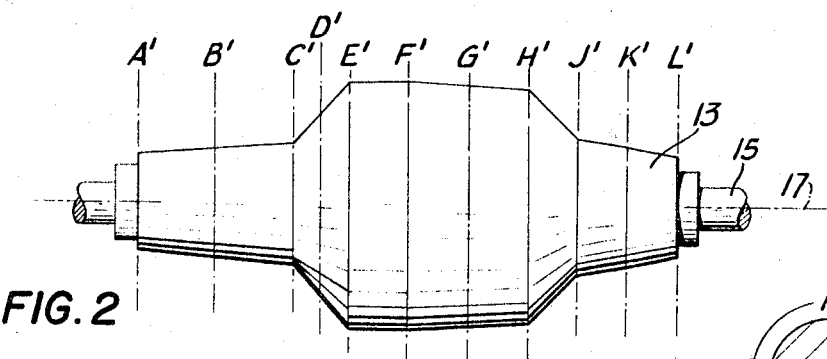
FIG. 2
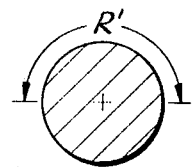
FIG. 2K'
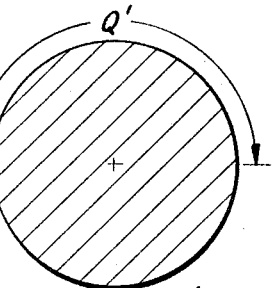
FIG. 2B'
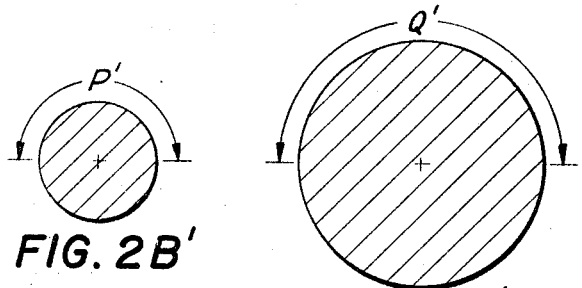
FIG. 2F'
INVENTOR.
JONAS MEDNEY
BY Sherman H. Barber
his Attorney INVENTOR.
JONAS MEDNEY
BY Sherman H Barber
his Attorney

United States Patent Office 3,449,484
Patented June 10, 1969

3,449,484
METHOD FOR FORMING FILAMENT REINFORCED RESIN SHELLS OF NON-UNIFORM CROSS SECTION
Jonas Medney, Oceanside, N.Y., assignor to Koppers Company, Inc., a corporation of Delaware
Continuation-in-part of application Ser. No. 549,739, Mar. 30, 1966, which is a continuation-in-part of application Ser. No. 288,248, June 17, 1963. This application Oct. 5, 1966, Ser. No. 584,598
Int. Cl. B29c 27/16, 25/00
U.S. Cl. 264—159                    7 Claims

ABSTRACT OF THE DISCLOSURE

A mandrel is specially prepared to receive resin impregnated filaments that are wound on the mandrel to form a skin on the mandrel. When cut and removed, each one-half skin portion is draped in a mold and the skin is urged into conformity with the mold and the resin is cured to form a hollow shell.

The mandrel is so formed that at any cross section, the perimetrical length is equal to twice the perimetrical length of a corresponding cross section of the mold.

---

This invention relates to the method for forming a filament reinforced resin shell having a surface contour of non-uniform cross section and is a continuation-in-part of co-pending application Ser. No. 549,739 filed Mar. 30, 1966, now abandoned, which is a continuation-in-part of application Ser. No. 288,248 filed June 17, 1963, now abandoned.

Glass fiber reinforced plastic structures are known to have many characteristics that make such structures desirable for use in many services where structures are now commonly made of other materials such as metal or wood. A few of the characteristics that make glass fiber reinforced plastic structures so desirable are high strength, lower weight, corrosion resistance, and dimensional stability. Glass fiber reinforced plastic structures that have the desired structural characteristics are, to name a few, boat hulls, automobile bodies, pressure vessels, and components usable in guided missiles and the like.

Such structures, however, usually have warped exterior surfaces, that is, exterior surfaces which are non-uniform and irregular because of aesthetic or functional reasons and which cannot be developed as a flat surface. As is well known, warped, irregular surfaces cannot be made from flat sheets because wrinkling and creasing appear in the flat sheet when it is applied to the warped surface and attempts to conform the flat sheet smoothly to the curvature of the warped surface fail. The body of an automobile, for example, is an irregular, warped surface, and if, during the manufacture of the automobile body, a flat sheet of plastic material were applied to a mold for the purpose of forming the automobile body, it would be necessary to cut portions of the sheet in one or more local areas to avoid wrinkles and creases, and in other areas it would be necessary to cut the sheet and insert a patch or two so that the plastic sheet could be fitted to the mold. It is virtually impossible to conform a flat sheet of plastic material, or metal for that matter, to a warped surface, such as an automobile body, to produce a body that is smooth and which has substantially a uniform thickness throughout. In any case, whenever a flat sheet is applied to form a warped surface there will be rough places where the sheet is cut and patched, and thick and thin sections where the sheet has been stretched or pulled together to try to conform the sheet to the warped surface.

The present invention provides a novel method for filament winding a resin impregnated skin that can readily be adapted to the warped surface of a mold without producing wrinkles or creases, and without stretching the skin; which skin can be cured to produce a hardened filament reinforced plastic shell. In accordance with the method, a plurality of resin wet filament reinforcements are applied, as by winding, to the outer surface of a revolvable mandrel having an irregular surface comprised of abutting cylindrical and conic portions. The perimeter of the cylindrical and conic portions, at respective spaced apart cross sections, bears a definite relation to the perimeter of the warped surface at respective cross sections along its length. The resin wet filament reinforcements, after being applied to the mandrel, are partially cured to form a skin that is removed from the mandrel, as by cutting along the longitudinal axial plane to produce two similar skin portions of substantially equal size. One skin portion is then applied to the mold with the respective cross sections in registration. The skin readily conforms to the shape of the mold, and thereafter the partially cured skin is cured to produce a rigid shell having the desired shape of the warped surface.

For a further understanding of the present invention and for advantages and features thereof, reference may be made to the following description taken in conjunction with accompanying drawings which show for the purpose of exemplification a preferred embodiment of the invention.

In the drawings:

FIG. 1 is a schematic elevational view of the mold for a typical warped surface, an automobile body;

FIG. 1B is a transverse cross sectional view on line B of FIG. 1;

FIG. 1F is a transverse cross sectional view on line F of FIG. 1;

FIG. 1K is a transverse cross sectional view on line K of FIG. 1;

FIG. 2 is a schematic view of a contoured forming mandrel;

Figure 3:
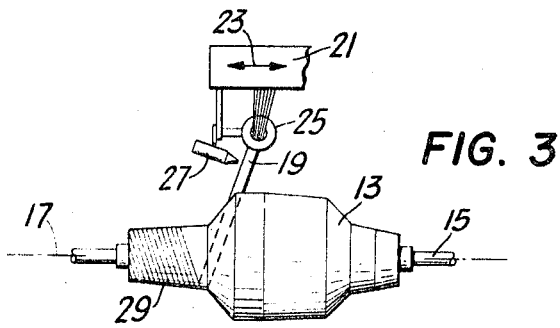
Figure 4:
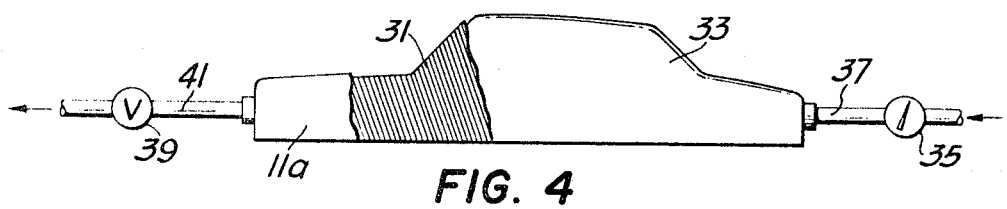
Figure 5:
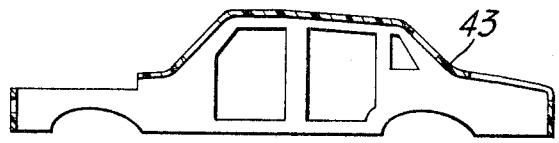
Figure 6:
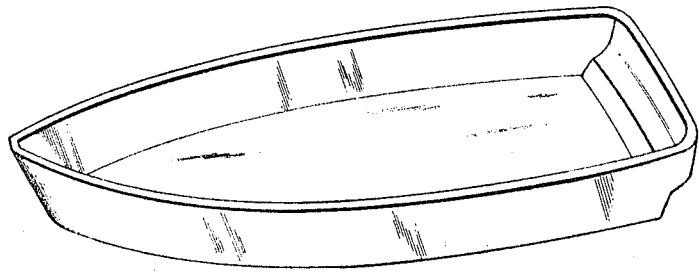
Figure 7:
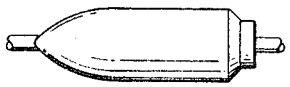

FIG. 2B′ is a transverse cross sectional view on line B′ of FIG. 2;

FIG. 2F′ is a transverse cross sectional view on line F′ of FIG. 2;

FIG. 2K′ is a transverse cross sectional view on line K′ of FIG. 2;

FIG. 3 is a schematic view of the contoured forming mandrel as it is being wound;

FIG. 4 is a schematic representation showing a skin portion being conformed to the mold;

FIG. 5 is a schematic representation of the finished shell of the warped surface of FIG. 1;

FIG. 6 is a schematic representation of a boat hull formed in accordance with the method of the present invention; and FIG. 7 is a schematic representation of a missile type object formed in accordance with the method of the present invention.

Referring to the drawings, FIG. 1 illustrates a typical mold member 11, which, for the purpose of exemplification, is illustrated as the mold for an automobile body. In accordance with this invention, the length of the mold is divided into a convenient number of stations, represented as A, B, C, etc., which need not necessarily be equally spaced apart; in fact, some of the stations are purposely chosen to coincide with points on the body contour where the contour of the body makes a radical change in slope. Typical cross sections at three stations B, F, K, are shown in FIGS. 1B, 1F, 1K, respectively.

In accordance with the invention, the perimeter of each of the sections or stations are measured, or calculated, and the perimeter so found is converted to an arc of a semi-circle having an equal length. For example, the length of the perimeter of the section B is found to be a distance P (FIG. 1B); the length of the perimeter of the section F is found to be a distance Q (FIG. 1F); and the length of the perimeter of the section K is found to be a length R (FIG. 1K). Then, circles that have a circumference equal to twice the perimetrical length at each of the several stations are constructed; these circles will be cross sections of a surface of revolution at corresponding stations B', F' and K', as illustrated in FIG. 2, of a contoured forming mandrel 13.

A transverse cross section of the contoured forming mandrel at station B' is shown in FIG. 2B' and is a circle having a circumference equal to twice the perimetrical length, P, of the contour of the mold 11 at section B, shown in FIG. 2B. Likewise, the length of the circumference of the circle of cross section at station 2F' of the contoured mandrel is equal to twice the perimetrical length, Q, of the mold 11 at station 2F; and, also, the circumferential length of the cross section at station 2K' of the contoured mandrel is equal to twice the peripheral length, R, of the mold 11 at station 2K. It should be apparent, then, that the surface area of the mandrel 13 is equal to approximately twice the surface area of the mold 11.

In accordance with the invention, the mandrel 13 is prepared from conventional material, such as plaster, wood, or the like, so that at each respective transverse cross section, A', B', C', etc., the length of the circumference of the circular cross section of the mandrel is equal to twice the perimetrical length at corresponding sections A, B, C, etc., of the mold 11. The mandrel 13, so produced, then, is a series of juxtaposed conical and cylindrical portions, disposed in abutting relation (FIG. 2) and forming a solid that is revolvable upon a shaft 15 about a longitudinal axis 17 of revolution.

After the mandrel has been prepared for rotation about the axis 17 (FIG. 3), a plurality of resin impregnated fiber reinforcements, in the form of rovings 19, are applied to the mandrel 13 in a known manner. One such manner, illustrated in FIG. 3, includes a carriage 21 that travels to and fro in the direction of the longitudinal axis 17, in the direction of the arrow 23, and carries an eye 25 through which the rovings 19 pass, so as to place the rovings 19 in juxtaposed relation to other rovings previously wound on the mandrel, in accordance with known methods. A nozzle 27 is provided adjacent the rovings 19 to wet the fibers of the roving with a binder resin, such as an epoxide type resin; though other types of binder resins may be used if preferred by those skilled in the art.

While FIG. 3 illustrates one way in which the resin wet filaments may be applied to the surface of the mandrel 13, those skilled in the art will know of other ways in which such reinforcements may be applied, and it may be preferred that such other methods be used. Of course, a suitable release agent usually is applied to the surface of the mandrel 13 initially, before any resin wet fiber reinforcements are applied thereon.

After the resin wet filaments have been so formed on the mandrel 13 as a skin, it is partially cured to such a state that it is a flexible membrane 29. The partially cured skin 29 is removed from the mandrel 13 by severing the skin longitudinally, generally in the plane containing the axis of revolution 17, to produce two skin portions 31 (only one being shown in FIG. 4) which are substantially equal in size.

After the skin 29 has been severed into two substantially equal sized portions, one of the skin portions 31 is applied to the surface of the mold 11 (FIG. 4), to which has previously been applied a suitable mold release agent, so that the transverse sections A', B', C', etc., of the skin portion 31, are in substantial registration with corresponding sections A, B, C, etc., of the mold 11.

Thereafter, any suitable known method may be employed to urge the skin portion 31 into conformity with the surface of the mold 11. One such method, the "bag" method, is illustrated in FIG. 4. In this instance, a female type mold 11a is used, and one of the skin portion 29 is applied to the inside surface of the mold 11a, to which has previously been applied a suitable release agent. An inflatable bag 33, the outer surface of which is coated with a suitable release agent, is fitted into the hollow portion of the partially cured skin 31 and the bag 33 is inflated by air in a conventional manner to a pressure that may be read on a conventional dial gage 35 in an air inlet conduit 37; valve 39 in an outlet conduit 41 being closed at this time. The skin portion 31, having been formed on a mandrel 13 which is sized proportional to such a mold, readily conforms to the contour shape of the mold without producing the usual creases and wrinkles that appear when conventional hand lay-up methods are used to fabricate such a contoured surface.

As soon as conformity is achieved between the skin portion 31 and the surface of the mold 11a, the partially cured resin may be heated to accelerate completion of its curing, in a known manner, or it may be allowed to complete curing at ambient temperature. In any case, after curing sufficiently, the bag 33 is deflated and the previously flexible skin portion 31 is removed from the cavity of the mold 11a as a filament reinforced rigid shell having the desired thickness and strength characteristics.

After the rigid, fiber reinforced plastic shell is removed from the mold 11a, it may be then treated further to remove material in the location of the windshield, wheels, radiator, doors, etc., and some of the material removed in the location of the doors, trunk lid, hood, may be used to fabricate these particular structural members. FIG. 5 illustrates a finished automobile body 43 wherein openings are made for the radiator, doors, windows, windshield, wheels, engine hood, etc.

Whenever desirable, localized variations in the thickness of the skin 31 may be made by applying additional resin wet fiber reinforcements to a particular localized area or areas before the partially cured skin is inserted into the mold.

In practicing the method of the invention, it is expected that the fiber reinforcements would be glass filaments, which are known to have desirable physical properties such as high strength, corrosion resistance, and which are readily available at an economic price. It is, of course, understood, that the method of the invention is not so limited to the use of only glass filaments, but, rather, the method may be practiced using any desired or suitable filament material.

Those skilled in the art will recognize that products produced in accordance with the method of the invention, such as automobile bodies, have a high glass to resin density, which means that the product has exceptional strength and low weight. One reason for obtaining additional strength in products formed in accordance with the invention is that the individual filaments or glass fibers operate independently of one another, and they are not crossed by other fibers in the manner of the fibers in woven fabrics such as mat or cloth.

Additionally, it is within the scope of the present invention to utilize a partially cured skin, after it has been removed from the mandrel 13 and without cutting it along the axis of rotation 17, by infolding the skin back upon itself, along the longitudinal axis of rotation, to form a single concave skin of double thickness. The double-thickness skin may then be applied to the mold, in the manner suggested above, cured, and removed therefrom as an article of manufacture. It should be evident to those skilled in the art that, whenever an intact partially cured skin is infolded upon itself, the skin is formed on the mandrel 13 to only one-half the desired thickness, since, when the single half thick skin is infolded upon itself, the resulting partially cured skin is of double-half thickness and equal to the desired thickness. In such instances, the winding time also may be practically cut in half.

In other instances, where an extra thick shell is required for particular structural purposes, the partially cured skin may be formed upon the mandrel 13 in the normal manner, and then, when removed from the mandrel, it may be infolded upon itself to produce a partially cured skin of double thickness that substantially meets the requirements of an extra thick skin.

Although the invention has been described herein with a certain degree of particularity, it is understood that the present disclosure has been made only as an example, and that various modifications and changes may be made within the scope of the invention.

What is claimed is:

1. A method for forming a filament reinforced resin shell having an undevelopable surface contour of non-uniform cross section, comprising the steps:
   (a) developing a mold having the same surface contour and size as said shell;
   (b) dividing the length of said mold into cross sections at selected increments of length;
   (c) determining the perimetrical length of the contour of the surface of said mold at each cross section;
   (d) developing a revolvable mandrel, having a length substantially the same as the length of said mold, with the cross section at any point along the length of said mandrel being circular;
   (e) dividing the length of said mandrel into increments that are spaced apart substantially the same distance as the incremental cross sections of the length of said mold;
   (f) forming the surface of said mandrel in such a manner that at each said increment the circumferential length of respective circular cross sections thereof is twice the perimetrical length of said surface of said mold at corresponding respective incremental cross sections;
   (g) winding on the surface of said mandrel resin wet filament reinforcements to form a filament reinforced resin skin of desired thickness;
   (h) partially curing the resin of said skin;
   (i) bisecting said skin into two equal portions each of which conforms substantially to said mold;
   (j) conforming one said skin portion to said mold; and
   (k) completing the curing of said resin whereby a filament reinforced resin shell having a continuous undevelopable surface of non-uniform cross section is formed without severing or appreciably stretching said skin to form said shell.

2. A method for forming a filament reinforced resin shell having an undevelopable surface contour of non-uniform cross section, comprising the steps:
   (a) providing a mold member having a surface contour substantially like the contour of the shell to be formed;
   (b) providing a revolvable mandrel having a non-uniform surface contour of circular cross section throughout such that the circumferential length at any cross section of said mandrel is twice the peripheral length of a corresponding cross section of said mold;
   (c) revolving said mandrel about its longitudinal axis;
   (d) winding resin wet filament reinforcements on said revolving mandrel to form a skin thereon of desired thickness;
   (e) partially curing the resin of said skin;
   (f) removing said skin from said mandrel;
   (g) severing said skin to produce two similar skin portions of substantially equal size;
   (h) applying one skin portion to said mold member;
   (i) applying pressure to said skin portion to conform the same to the surface contour of said mold;
   (j) curing the resin in said portion to form said shell; and
   (k) removing said shell from said mold.

3. A method for forming a filament reinforced resin shell having an undevelopable surface contour of non-uniform cross section, comprising the steps:
   (a) providing a mold member having a surface contour that is the same as the contour of the shell to be formed;
   (b) determining the perimetrical length of the contour of said body at selected cross sections;
   (c) providing a revolvable mandrel having a non-uniform surface contour of circular cross section throughout such that the circumferential length at any cross section of said mandrel is twice the peripheral length of a corresponding cross section of said mold;
   (d) revolving said mandrel about its longitudinal axis;
   (e) applying a plurality of resin wet filament reinforcements to the surface of said mandrel to produce a skin of substantially one-half of the desired thickness;
   (f) partially curing the resin of said skin;
   (g) removing said partially cured skin in an intact condition from said mandrel;
   (h) infolding said skin upon itself along a linear axis to produce a half-skin of desired thickness;
   (i) applying said half-skin to said mold member;
   (j) conforming said half-skin to the surface contour of said mold member;
   (k) curing the resin in said half-skin to produce the desired structural shell; and
   (l) removing said shell from said mold.

4. The method of claim 1 including:
   (a) applying a release agent to the mandrel surface prior to executing step (g); and
   (b) applying a release agent to the mold prior to executing step (j).

5. The method of claim 2 including:
   (a) applying a release agent to the mandrel prior to executing step (d); and
   (b) applying a release agent to the mold prior to executing step (h).

6. The method of claim 3 including:
   (a) applying a release agent to the mandrel prior to executing step (d); and
   (b) applying a release agent to the mold prior to executing step (h).

7. The method for forming a filament reinforced resin shell having a surface contour of non-uniform cross section, comprising the steps:
   (a) providing a mandrel member having a circular cross section at any point along its length and having, at each one of respective spaced apart cross sections transverse to an axis of said mandrel, a circumference equal in length to twice the peripheral length of said shell at a corresponding transverse cross section;
   (b) providing a mold member having a surface conforming to the contour of the shell to be formed;
   (c) applying a release agent to the surface of said mandrel;
   (d) applying a plurality of resin wet filament reinforcements to the surface of said mandrel to produce a skin of substantially one-half the desired thickness;
   (e) partially curing the resin of said skin;
   (f) removing said partially cured skin from said mandrel;
   (g) infolding said skin upon itself along a linear axis to produce a half-skin of desired thickness;
   (h) applying a release agent to the surface of said mold;
   (i) applying said formed half-skin to said mold member so as to conform said half-skin to the surface contour of said mold member;

(j) curing the resin in said half-skin to produce the desired shell; and (k) removing said shell from said mold.

References Cited

UNITED STATES PATENTS

| | | | |
|---|---|---|---|
| 2,749,266 | 6/1956 | Eldred | 264—137 |
| 2,859,936 | 11/1958 | Warnken. | |
| 3,265,795 | 8/1966 | Medney | 264—157 |
| 3,356,781 | 12/1967 | Sulowski | 264—137 |

ROBERT F. WHITE, *Primary Examiner.*

RICHARD R. KUCIA, *Assistant Examiner.*

U.S. Cl. X.R.

264—312, 320